(12) United States Patent
Nackers et al.

(10) Patent No.: US 10,920,861 B1
(45) Date of Patent: Feb. 16, 2021

(54) TOOL FOR INSTALLATION AND REMOVAL OF A STRETCH FIT BELT ON A MARINE ENGINE

(71) Applicant: Brunswick Corporation, Mettawa, IL (US)

(72) Inventors: Tyler J. Nackers, Menasha, WI (US); Wade A. Loberger, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 523 days.

(21) Appl. No.: 15/886,440

(22) Filed: Feb. 1, 2018

(51) Int. Cl.
*F16H 7/24* (2006.01)
*F16H 7/22* (2006.01)
*B25B 27/00* (2006.01)
*B25B 27/14* (2006.01)

(52) U.S. Cl.
CPC ............... *F16H 7/24* (2013.01); *F16H 7/22* (2013.01); *B25B 27/0035* (2013.01); *B25B 27/14* (2013.01)

(58) Field of Classification Search
CPC ......... F16H 7/22; F16H 7/24; B25B 27/0035; B25B 27/22; B25B 27/14; B25B 27/00
USPC .................... 474/130, 131, 132, 129, 119
See application file for complete search history.

(56) References Cited

U.S. PATENT DOCUMENTS

| 4,325,703 A | 4/1982 | Phillips |
| 6,402,649 B1 | 6/2002 | Amkreutz |
| 7,335,121 B2 | 2/2008 | Fletcher et al. |
| 8,241,159 B2 | 8/2012 | Iwata |
| 8,684,871 B2 | 4/2014 | Mitchell |
| 8,753,238 B2 | 6/2014 | Kunisada |
| 9,057,422 B2 | 6/2015 | Kurtz |
| 9,404,560 B2 | 8/2016 | Kurtz |

(Continued)

FOREIGN PATENT DOCUMENTS

| DE | 20201710007 U1 | 3/2017 |
| JP | 2009115150 A | 5/2009 |

(Continued)

OTHER PUBLICATIONS

Gates Europe, "How to Install an Elastic Belt in 9 Easy Steps," web article, 2017, available at https://www.gatestechzone.com/en/installation/belts-and-kits/elastic-belts, last accessed Dec. 28, 2017.

*Primary Examiner* — Michael R Mansen
*Assistant Examiner* — Raveen J Dias
(74) *Attorney, Agent, or Firm* — Andrus Intellectual Property Law, LLP

(57) ABSTRACT

A tool for installing and removing a stretch fit belt on a marine engine pulley includes a body having first and second ends, an inner face located adjacent an outer surface of the pulley, and an outer face guiding the belt. A rib on the inner face contacts a pulley groove. A wedge protrudes from a lower portion of the outer face near the body's first end and slopes downwardly from a wedge upper corner to a wedge lower corner located between the body's first and second ends. An overhang protrudes from an upper portion of the outer face near the body's second end and has a curved portion located between the body's first and second ends and a tapered portion extending from the curved portion to the body's second end. The tool is dimensioned to accommodate a width or a thickness of the belt during installation or removal thereof.

16 Claims, 6 Drawing Sheets

(56) References Cited

U.S. PATENT DOCUMENTS

| | | | |
|---|---|---|---|
| 2002/0103048 A1* | 8/2002 | Amkreutz | F16H 7/24 474/130 |
| 2003/0176248 A1 | 9/2003 | De Meester et al. | |
| 2005/0164815 A1 | 7/2005 | Winninger et al. | |
| 2006/0009322 A1* | 1/2006 | Fletcher | F16H 7/24 474/130 |
| 2008/0155803 A1 | 7/2008 | Iwata | |
| 2010/0125995 A1 | 5/2010 | Fukatani | |
| 2010/0173737 A1 | 7/2010 | Coirault et al. | |
| 2010/0248878 A1 | 9/2010 | Maruyama et al. | |
| 2012/0040791 A1* | 2/2012 | Mitchell | F16H 7/24 474/119 |
| 2014/0018200 A1* | 1/2014 | Kunisada | F16H 7/24 474/130 |
| 2016/0138686 A1 | 5/2016 | Aoki | |
| 2017/0211665 A1* | 7/2017 | Aoki | F16H 7/24 |
| 2017/0356530 A1* | 12/2017 | Aoki | F16H 7/02 |

FOREIGN PATENT DOCUMENTS

| | | |
|---|---|---|
| JP | 2014031881 A | 2/2014 |
| WO | 2002036987 A1 | 5/2002 |
| WO | 2008125461 A1 | 10/2008 |
| WO | 2010109088 A1 | 9/2010 |

\* cited by examiner

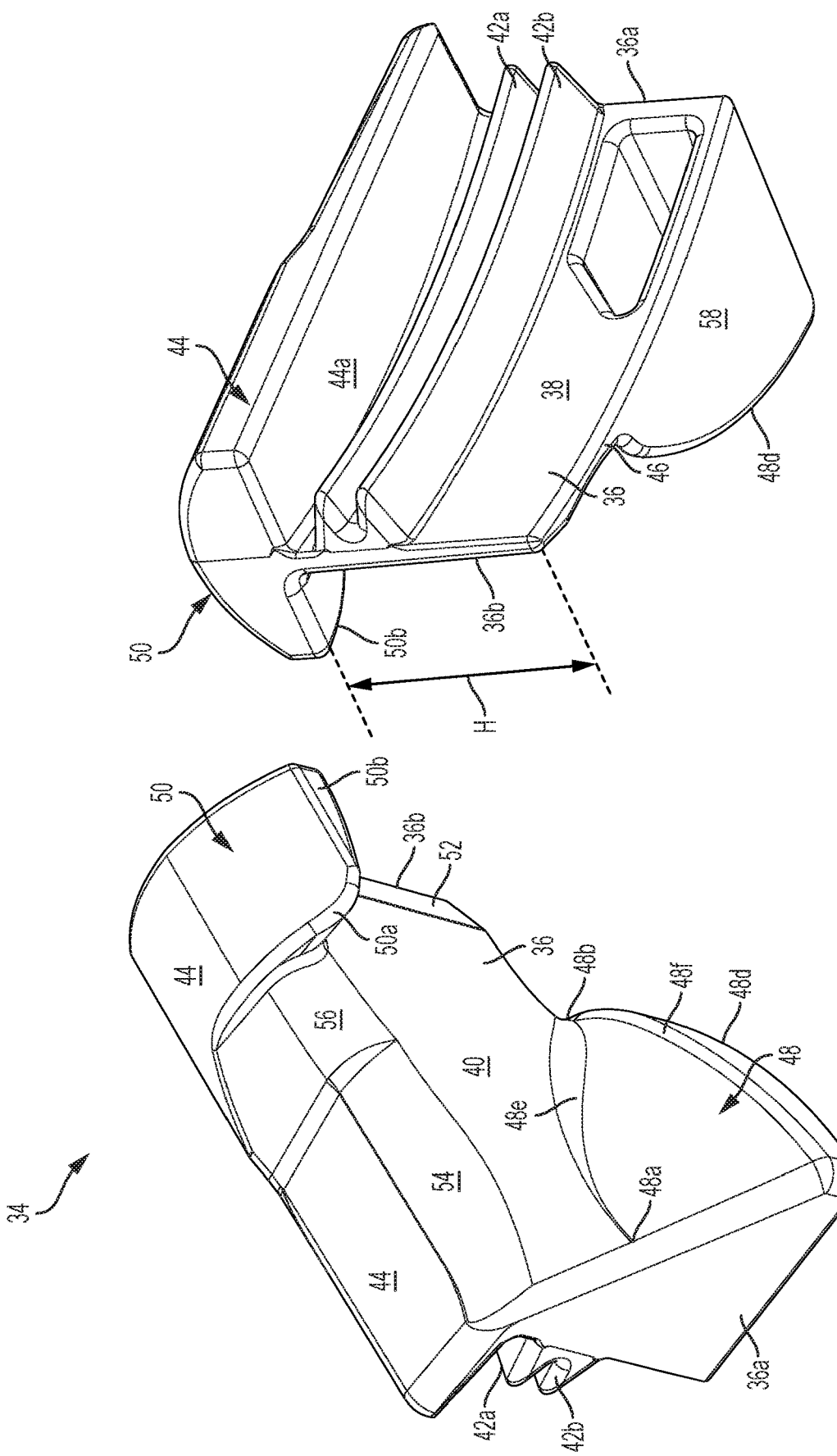

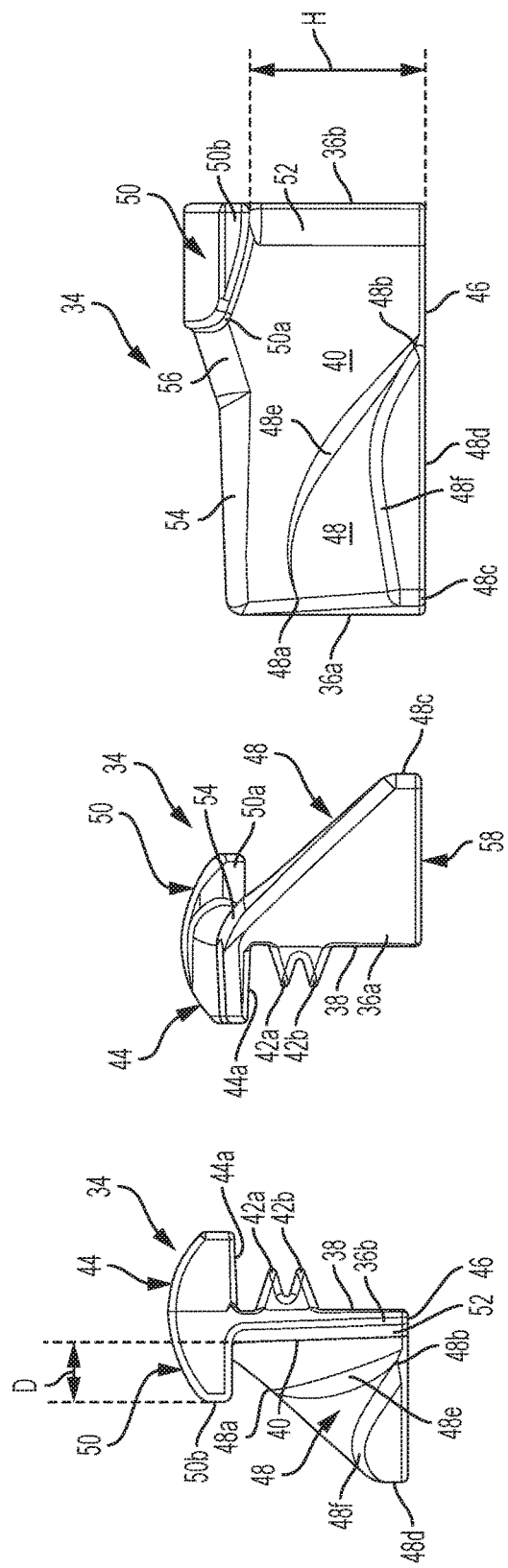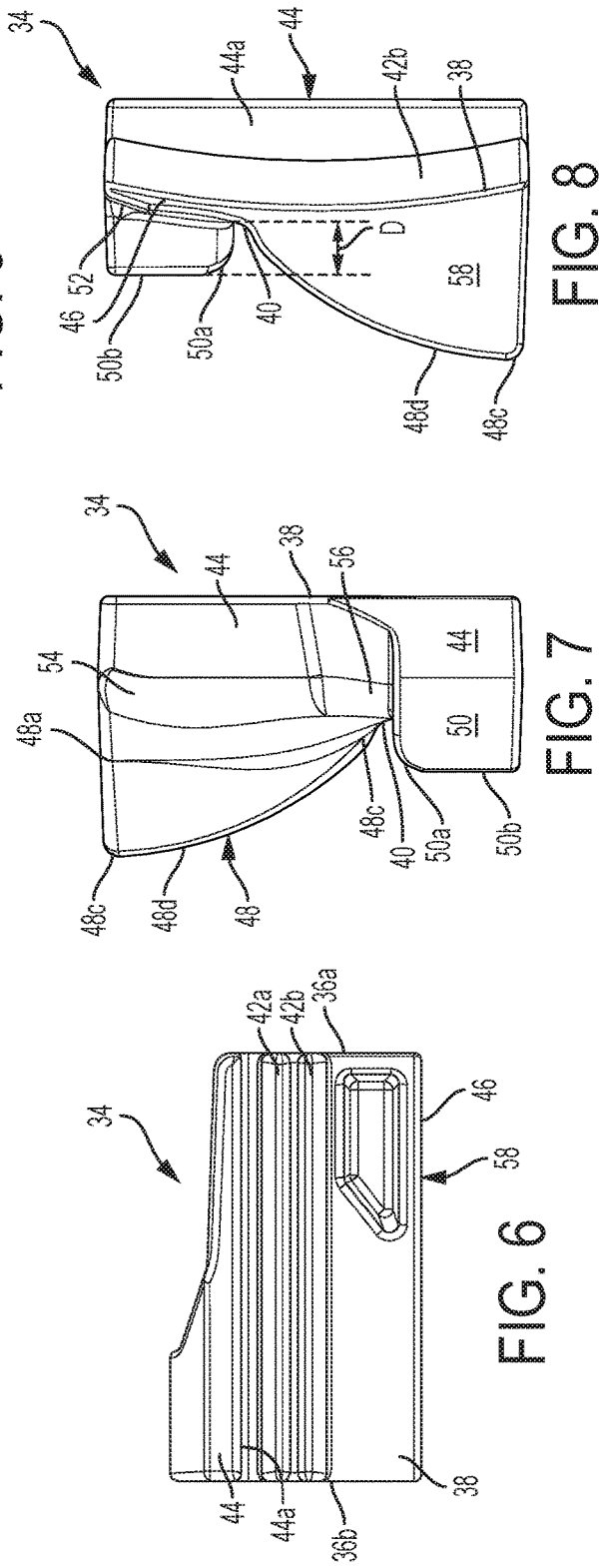

TOOL FOR INSTALLATION AND REMOVAL OF A STRETCH FIT BELT ON A MARINE ENGINE

FIELD

The present application relates to tools for installation and removal of a stretch fit belt on one or more pulleys associated with a marine engine.

BACKGROUND

U.S. Pat. No. 8,684,871 discloses a belt positioner for installing a flexible belt into a grooved periphery of a pulley. The positioner comprises a belt guiding ramp, a pulley flange engaging mechanism, a handle and a belt guiding rim. The belt guiding ramp is extendible across the grooved periphery and a belt-bearing slanting surface of the ramp enables the belt to be moved into engagement with the grooved periphery when the pulley is rotated about its rotational axis. The pulley flange engaging mechanism comprises a groove extending across the positioner for receiving a pulley flange bordering the grooved periphery and a shoulder bordering the groove for bearing against a side face of the pulley flange, wherein the engaging mechanism locks the positioner to the pulley while the belt bears against the slanting surface. The handle extends from the ramp and provides a gripping surface for fingers adjacent the ramp. In use the handle extends laterally of the grooved periphery and substantially parallel with the rotational axis of the pulley. When installing a belt, the positioner need not engage a shaft of the pulley nor be mounted to the pulley in any additional way.

U.S. Pat. No. 9,404,560 discloses a unitary stretch belt installation and removal tool including an installation component having a slot for positioning the tool on the rim of a pulley and a wedge shaped element to stretch and guide a belt into a pulley groove as the pulley is rotated and further having an integral removal component including a slot and a shaped, generally convex belt guide surface for stretching and guiding a belt from a pulley as the pulley is rotated.

SUMMARY

This Summary is provided to introduce a selection of concepts that are further described herein below in the Detailed Description. This Summary is not intended to identify key or essential features of the claimed subject matter, nor is it intended to be used as an aid in limiting scope of the claimed subject matter.

According to one example of the present disclosure, a tool for installing and removing a stretch fit belt on a pulley coupled to a marine engine includes a body having first and second ends, an arcuate inner face configured to be placed adjacent an outer circumferential surface of the pulley, and an opposing outer face configured to guide the belt thereover. At least one arcuate rib protrudes from the inner face and is configured to contact a groove on the outer circumferential surface of the pulley. A wedge protrudes from the lower portion of the outer face proximate the first end of the body. The wedge slopes downwardly from a wedge upper corner at the first end of the body and along the outer face to a wedge lower corner located between the first and second ends of the body. An overhang protrudes from an upper portion of the outer face proximate the second end of the body. The overhang has an overhang curved portion located between the first and second sends of the body and an overhang tapered portion extending from the overhang curved portion to the second end of the body. The outer face of the body is configured to accommodate a width of the belt between the wedge lower corner and the overhang curved portion.

Another example according to the present disclosure is of a tool for installing and removing a stretch fit belt on a pulley coupled to a marine engine and including an arcuate body having first and second ends, an inner face configured to be placed adjacent an outer circumferential surface of the pulley, and an opposing outer face configured to guide the belt thereover. A wedge protrudes from a lower portion of the outer face proximate the first end of the body. The wedge slopes downwardly from a wedge upper corner and along the outer face to a wedge lower corner between the first and second ends of the body and slopes downwardly from the wedge upper corner and outwardly away from the outer face to a wedge outer corner. The wedge outer corner and the wedge lower corner are connected by a wedge curved edge, and the wedge also slopes downwardly from the wedge upper corner to the wedge curved edge. An overhang protrudes from an upper portion of the outer face proximate the second end of the body. The overhang has an overhang curved portion between first and second ends of the body and an overhang tapered portion extending from the overhang curved portion and sloping downwardly away from the overhang curved portion toward the second end of the body. A ledge protrudes from the inner face of the tool. A lower surface of the ledge is configured to rest on an outer flange of the pulley when the inner face is placed adjacent the outer circumferential surface of the pulley. A beveled surface connects the ledge to the upper portion of the outer face of the body except where the overhang protrudes from the outer face.

According to yet another example of the present disclosure, a tool for installing and removing a stretch fit belt on a pulley coupled to a marine engine includes an arcuate body having first and second ends, an inner face configured to be placed adjacent an outer circumferential surface of a pulley, and an opposing outer face configured to guide the belt thereover. A wedge protrudes from a lower portion of the outer face proximate the first end of the body. The wedge slopes downwardly from a wedge upper corner at the first end of the body and along the outer face to a wedge lower corner between the first and second ends of the body. An overhang protrudes from an upper portion of the outer face proximate the second end of the body. The overhang has an overhang curved portion between the first and second ends of the body and an overhang tapered portion extending from the overhang curved portion to the second end of the body. The outer face of the body between the wedge lower corner and overhang curved portion is configured to accommodate a width of the belt therebetween. Between the wedge lower corner and the second end of the body, the outer face is configured to be substantially parallel to the outer circumferential surface of the pulley when the inner face is placed adjacent the outer circumferential surface of the pulley.

BRIEF DESCRIPTION OF THE DRAWINGS

The present disclosure is described with reference to the following Figures. The same numbers are used throughout the Figures to reference like features and like components.

FIG. 1 illustrates a perspective view of an outer face of a first embodiment of a tool for installing and removing a stretch fit belt on a pulley coupled to a marine engine.

FIG. 2 illustrates a perspective view of an inner face of the first embodiment of the tool.

FIG. 3 illustrates a first side view of the tool of FIGS. 1 and 2.

FIG. 4 illustrates an opposite side view thereof.

FIG. 5 illustrates an elevational view of the outer face of the first embodiment of the tool.

FIG. 6 illustrates an elevational view of the inner face of the first embodiment of the tool.

FIG. 7 illustrates a top view of the first embodiment of the tool.

FIG. 8 illustrates a bottom view of the first embodiment of the tool.

DETAILED DISCLOSURE

In the present description, certain terms have been used for brevity, clarity and understanding. No unnecessary limitations are to be inferred therefrom beyond the requirement of the prior art because such terms are used for descriptive purposes only and are intended to be broadly construed. The different methods and assemblies described herein may be used alone or in conjunction with other methods and assemblies.

Endless flexible drive belt and pulley arrangements are commonly used in marine vessels as well as in other types of machinery. For example, a flywheel connected to a crankshaft of an engine can have a pulley attached thereto, which pulley can be used to drive marine engine components such as, but not limited to, an alternator, a charge air compressor, or a belt-driven pump, such as a steering pump. A stretch fit belt may be fitted around the pulley on the flywheel and a pulley on the component in question at the factory using specialized installation equipment. However, when replacement of the belt is required in the field, the recommended service procedure is to cut the old belt from the pulleys. Then, using model-specific tools, a new belt can be wound back onto the pulleys, requiring that the service agent have multiple installation tools available. Such tools are both expensive and difficult to use, as there are multiple components requiring assembly and adjustment to operate. Additionally, cutting the belt is wasteful if one is removing a newish belt in order to service or replace a different engine accessory. The present inventors have therefore developed a tool for both installation and removal of a stretch fit belt on a pulley, which tool has a single locating feature on its inner face for engaging ribs on the pulley and a single outer surface that facilitates installation and removal of the stretch fit belt. Details of such a tool are provided herein below.

Figure 9:
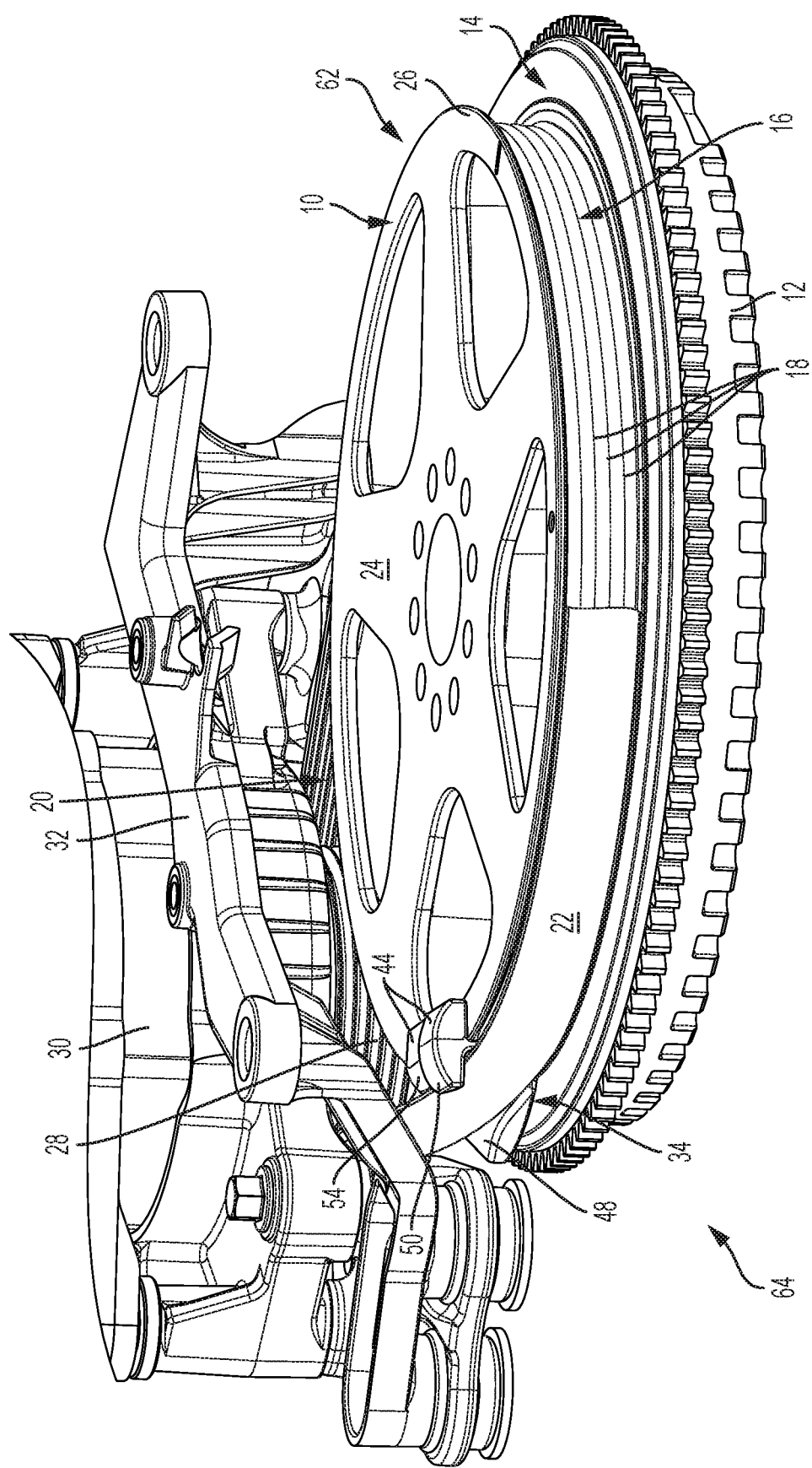
FIG. 9 illustrates a view of the first embodiment of the tool in conjunction with a pulley on a flywheel of a marine engine.

FIG. 9 illustrates a pulley 10 attached to a flywheel 12, which is in turn connected to a crankshaft of an engine (not shown). The flywheel 12 has an outer surface 14 on which the pulley 10 is situated. Note that although the outer surface 14 is shown herein as a top surface, the orientation of the engine, flywheel 12, and pulley 10 could be other than that shown herein, depending on the application. For example, the engine on which the present flywheel 12 is situated may be an upright V-shaped engine with a vertically extending crankshaft. The pulley 10 has an outer circumferential surface 16 including a plurality of circumferential grooves 18. The grooves 18 interact with ribs 20 on an inner face of the stretch fit belt 22 in order to hold the belt 22 in place around the outer circumferential surface 16. The pulley 10 also has an outer surface 24 including an outer flange 26, which overhangs the outer circumferential surface 16 and ensures that the belt 22 does not slide off the outer circumferential surface 16 of the pulley 10. However, this same outer flange 26 makes it difficult to stretch the belt 22 around the outer circumferential surface 16 of the pulley 10 during installation and removal of the belt 22. In the example shown herein, the belt 22 extends from around the outer circumferential surface 16 of the pulley 10 to a second pulley 28, which is connected to a drive shaft of an alternator 30. Note, however, that the belt 22 could be connected to any other type of belt-driven component associated with a marine engine.

FIG. 9 also shows a crossover bracket 32, which may hold a component associated with the engine, such as an oil fill tube or an air box. The nature of the packaging requirements for the engine, which must accommodate the alternator 30, the additional component (e.g., the oil fill tube or the air box), and the bracket 32 that holds this additional component, as well as other engine components not shown here, makes it difficult to install and remove the belt 22 even before the tautness of the belt 22 is taken into consideration. Therefore, the present inventors have designed a tool 34 for installation and removal of the belt 22 on the pulley 10 coupled to the marine engine, which tool 34 has a low profile and therefore is able to fit underneath the bracket 32 during such installation and removal. Note that although the tool 34 is shown as being placed on the starboard side 64 of the engine herein, installation and removal of the belt 22 on the opposite, port side 62 of the engine is also possible using a tool that is a mirror image of the tool 34.

Turning to FIGS. 1-8, details of a first embodiment of the tool 34 will be described. The first embodiment of the tool 34 includes an arcuate body 36 having first and second ends 36a, 36b. The curvature of the arcuate body 36 generally matches the curvature of the outer circumferential surface 16 of the pulley 10, such that an inner face 38 of the body 36, which is configured to be placed adjacent the outer circumferential surface 16 of the pulley 10, is also arcuate and can rest immediately adjacent the outer circumferential surface 16. The body 36 also has an opposing outer face 40 configured to guide the belt 22 thereover (see FIG. 9). At least one arcuate rib 42a or 42b protrudes from the inner face 38 of the body 36 and is configured to contact a groove on the outer circumferential surface 16 of the pulley 10. In the present example, a pair of arcuate parallel ribs 42a, 42b protrudes from the inner face 38 of the body 36. The ribs 42a, 42b are configured to sandwich a groove in the plurality of grooves 18 on the outer circumferential surface 16 of the pulley 10 therebetween. In other examples, one, three, four, or more ribs could be provided. A ledge 44 also protrudes from the inner face 38 of the body 36. A lower surface 44a of the ledge 44 is configured to rest on the outer flange 26 of the pulley 10 when the inner face 38 is placed adjacent the outer circumferential surface 16 of the pulley 10. Note therefore that spacing between the upper rib 42a and the lower surface 44a of the ledge 44 is such that the outer flange 26 on the pulley 10 can fit therebetween. Additionally, note that the spacing of the lower rib 42b from a bottom surface 46 of the body 36 is such that the bottom surface 46 can rest on or near the outer surface 14 of the flywheel 12. It should be noted, however, that the ribs 42a and 42b could be situated elsewhere on the inner face 38, such that a different (lower) groove on the outer circumferential surface 16 of the pulley 10 is engaged between the ribs 42a, 42b. Also note that although the ledge 44 extends the entire length of the body 36, the ledge 44 could instead extend for only a portion of the length of the body 36 and still accomplish the function of resting on the outer surface 24 of the pulley 10, and more specifically its outer flange 26.

A wedge 48 protrudes from a lower portion of the outer face 40 proximate the first end 36a of the body 36. The wedge 48 slopes downwardly from a wedge upper corner 48a at the first end 36a of the body 36 and along the outer face 40 to a wedge lower corner 48b located between the first and second ends 36a, 36b of the body 36. The wedge 48 also slopes downwardly from the wedge upper corner 48a and outwardly away from the outer face 40 to a wedge outer corner 48c. The wedge outer corner 48c and the wedge lower corner 48b are connected by a wedge curved edge 48d. The wedge 48 also slopes downwardly from the wedge upper corner 48a to the wedge curved edge 48d. A widening chamfer 48e is provided between the outer face 40 and the wedge 48, between the wedge upper corner 48a and the wedge lower corner 48b. A beveled surface 48f is provided just above the wedge curved edge 48d. Thus, the wedge 48 overall has a smooth surface for passage of the belt 22 thereover.

An overhang 50 protrudes from an upper portion of the outer face 40 proximate the second end 36b of the body 36. The overhang 50 includes an overhang curved portion 50a located between the first and second ends 36a, 36b of the body 36. The overhang 50 also includes an overhang tapered portion 50b extending from the overhang curved portion 50a to the second end 36b of the body 36. More specifically, the overhang tapered portion 50b slopes downwardly away from the overhang curved portion 50a, such that it has its widest dimension at the second end 36b.

The shape of the body 36 is specifically designed to accommodate the pulley 10 and the belt 22. For example, the ribs 42a, 42b follow the arcuate contour of the inner face 38 in order that they can engage a groove 18 on the pulley 10 along their entire lengths. Note that the ribs 42a, 42b need not extend the entire length of the inner face 38, but could be some length that is shorter than that of the inner face 38. Meanwhile, the outer face 40 of the body 36 is configured to accommodate a width W of the belt 22 between the wedge lower corner 48b and the overhang curved portion 50a. See FIG. 11. This allows the belt 22 to be guided over the outer face 40 of the body 36 without being pinched, folded, or otherwise distorted from its normal width W. Additionally, between the wedge lower corner 48b and the second end 36b of the body 36, the outer face 40 is configured to be substantially parallel to the outer circumferential surface 16 of the pulley 10 when the inner face 38 is placed adjacent the outer circumferential surface 16 of the pulley 10. The upper surface of the wedge 48 has an angle of approximately 45 degrees with respect to a bottom surface 58 thereof at the wedge lower corner 48b. The wedge 48 ends at the wedge lower corner 48b approximately in the center of the outer face 40 of the body 36, in order to allow the belt 22 to thereafter be guided over the outer face 40, which, as noted, is approximately parallel to the outer circumferential surface 16 of the pulley 10. This allows for a smooth transition between the outer face 40 of the body at the second end 36b and the outer circumferential surface 16 of the pulley 10, due to the essentially tangential meeting between the two surfaces.

A beveled surface 52 can be provided on the outer face 40 of the body 36 at its second end 36b in order to further smooth the transition between the tool 34 and the outer circumferential surface 16 of the pulley 10. A beveled surface 54 also connects the ledge 44 to the upper portion of the outer face 40 except where the overhang 50 protrudes from the outer face 40. This beveled surface 54 also ensures a smooth ride of the belt 22 over the ledge 44 and onto the outer face 40 of the body 36. A sloped surface 56 can be provided between the beveled surface 54 and the overhang 50, in order to further accommodate smooth passage of the belt 22 over the tool 34. The overhang curved portion 50a is designed without a sharp edge so that it does not kink or damage the belt 22.

Figure 10:
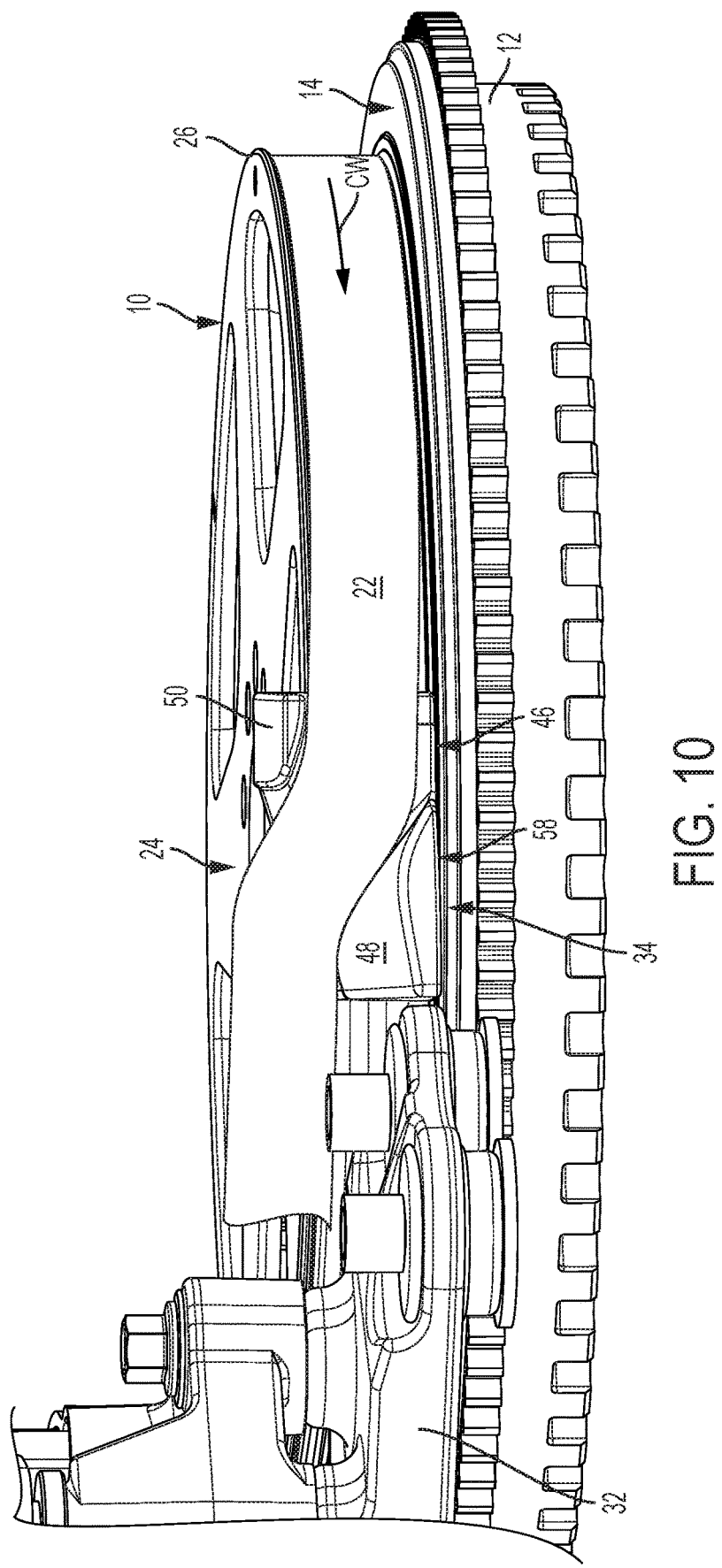
FIG. 10 illustrates a view of a stretch fit belt being installed onto the pulley.
Figure 11:
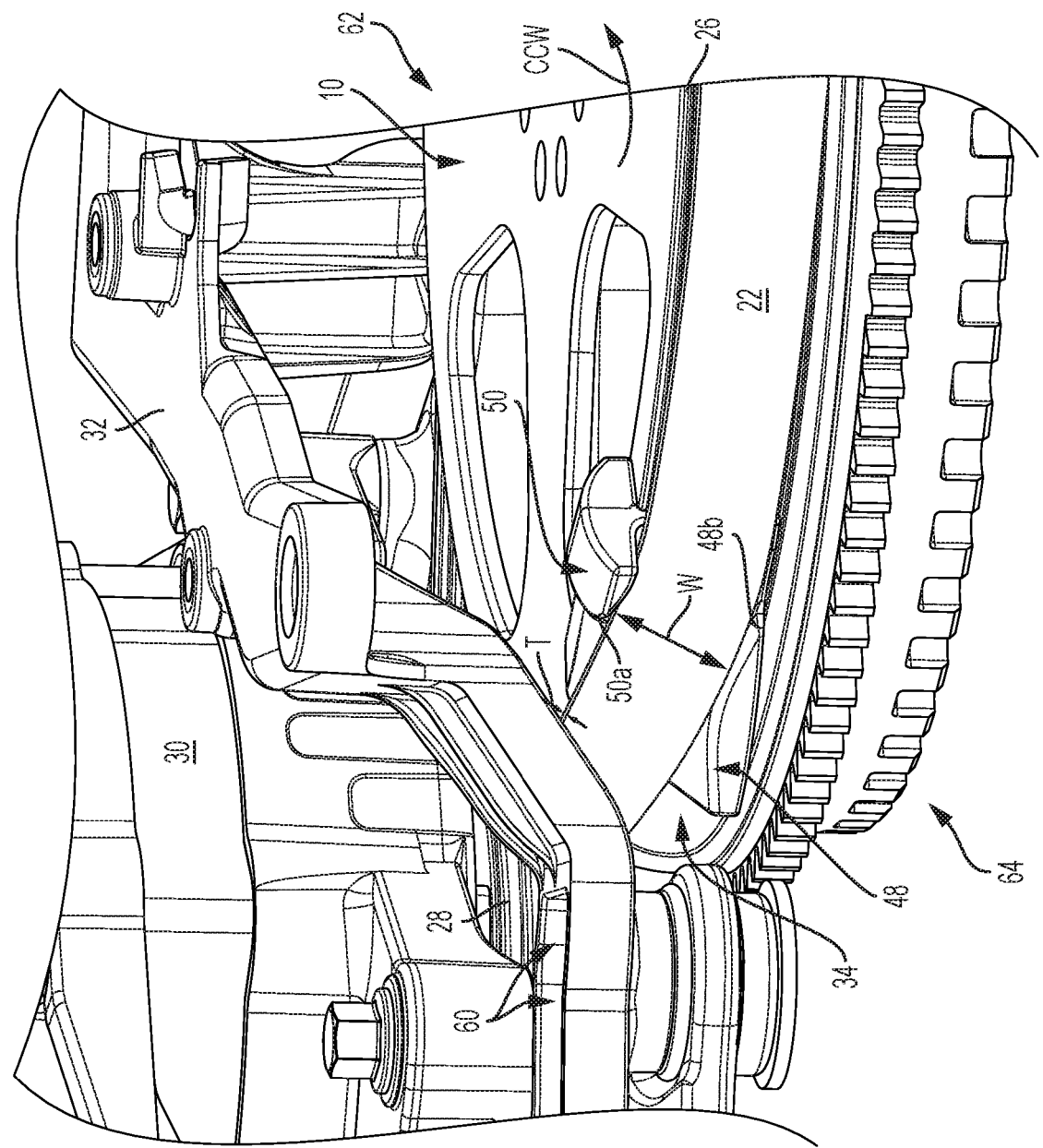
FIG. 11 illustrates a view of the stretch fit belt being removed from the pulley.
Figure 12:
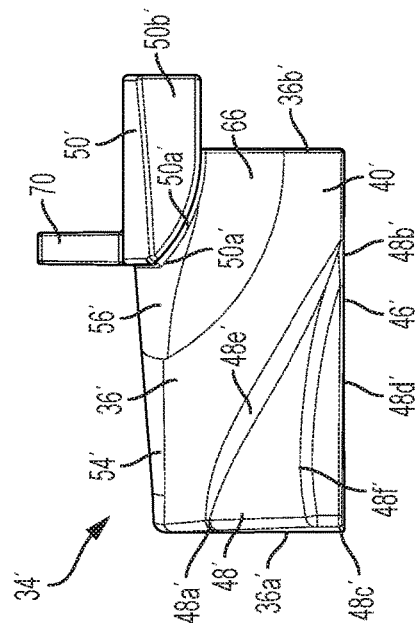
FIG. 12 illustrates a first side view of a second embodiment of a tool for installing and removing a stretch fit belt on a pulley coupled to a marine engine.
Figure 13:
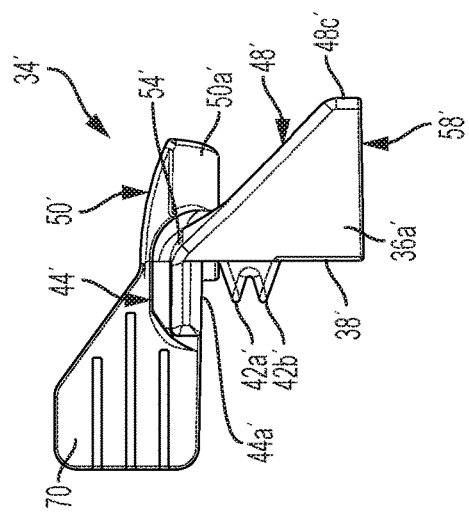
FIG. 13 illustrates an elevational view of an outer face of the second embodiment of the tool.
Figure 14:
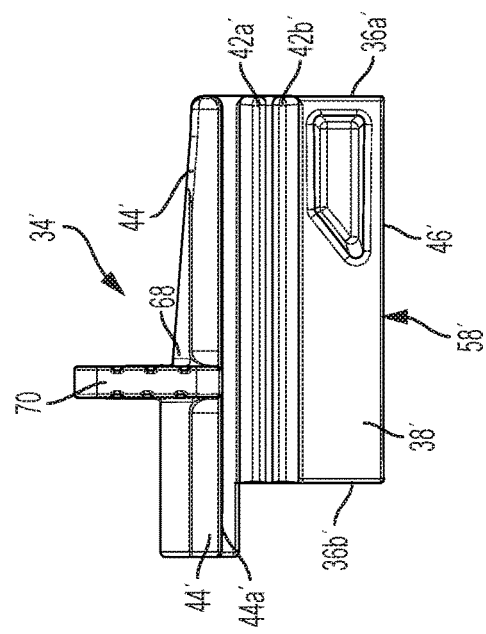
FIG. 14 illustrates an elevational view of an inner face of the second embodiment of the tool.
Figure 15:
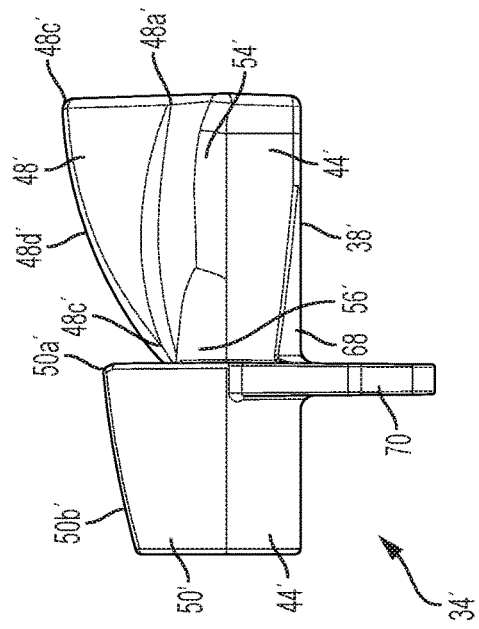
FIG. 15 illustrates a top view of the second embodiment of the tool.

The bottom surface 58 of the wedge 48 and the bottom surface 46 of the body 36 are configured to be parallel to the outer surface 14 of the flywheel 12 to which the pulley 10 is connected when the inner face 38 is placed adjacent the outer circumferential surface 16 of the pulley 10. As shown in FIGS. 10 and 11, this allows the bottom surface 58 of the wedge 48 and the bottom surface 46 of the body 36 to rest on the outer surface 14 of the flywheel 12. With reference to FIGS. 2, 5, and 11, a height H of the outer face 40 of the body 36 beneath the overhang tapered portion 50b is configured to accommodate the width W of the belt 22. Thus, the dimensions of the outer face 40 of the body 36 ensure that the belt 22 will not bend, fold, or otherwise distort as the belt 22 passes underneath the overhang 50. Additionally, with reference to FIGS. 3, 8, and 11, note that a depth D of the overhang 50 with respect to the outer face 40 of the body 36 is configured to accommodate a thickness T of the belt 22 thereunder. Note that this depth D is not necessarily uniform, as the overhang tapered portion 50b and the outer face 40 do not have completely parallel surfaces. However, at least a portion of this depth D has a dimension great enough to accommodate the thickness T of the belt 22. This dimensioning of the depth D of the overhang 50 ensures that the belt 22 remains guided by the tool 34 and does not slip off the tool during installation or removal.

Thus, the present disclosure is of a tool 34 having a wedge 48 protruding from a lower portion of the outer face 40 of the body 36 proximate the first end 36a of the body 36. The wedge 48 slopes downwardly from a wedge upper corner 48a and along the outer face 40 to a wedge lower corner 48b between the first and second ends 36a, 36b of the body 36 and slopes downwardly from the wedge upper corner 48a and outwardly away from the outer face 40 to a wedge outer corner 48c. The wedge outer corner 48c and the wedge lower corner 48b are connected by a wedge curved edge 48d, and the wedge 48 also slopes downwardly from the wedge upper corner 48a to the wedge curved edge 48d. An overhang 50 protrudes from an upper portion of the outer face 40 proximate the second end 36c of the body 36. The overhang 50 has an overhang curved portion 50a between the first and second ends 36a, 36b of the body 36 and an overhang tapered portion 50b extending from the overhang curved portion 50a and sloping downwardly away from the overhang curved portion 50a toward the second end 36b of the body 36. A ledge 44 protrudes from the inner face 38 of the tool 34. A lower surface 44a of the ledge 44 is configured to rest on an outer flange 26 of the pulley 10 when the inner face 38 is placed adjacent the outer circumferential surface 16 of the pulley 10. A beveled surface 54 connects the ledge 44 to the upper portion of the outer face 40 of the body 36 except where the overhang 50 protrudes from the outer face 40.

Furthermore, the outer face 40 of the body 36 between the wedge lower corner 48b and the overhang curved portion 50a is configured to accommodate a width W of the belt 22 therebetween. Additionally, the tool 34 is configured such that between the wedge lower corner 48b and the second end 36b of the body 36, the outer face 40 is configured to substantially parallel to the outer circumferential surface 16 of the pulley 10 when the inner face 38 is placed adjacent the outer circumferential surface 16 of the pulley 10.

FIGS. 9-11 will now be used to describe installation and removal of the belt 22 on the pulley 10. As discussed briefly herein above, the profile of the tool 34 is such that the tool 34 can fit underneath the crossover bracket 32, which supports another component near the engine. More specifically, the ledge 44, overhang 50, and beveled surface 54 are all low enough with respect to the outer flange 26 that they do not interfere with the bracket 32 and also allow the belt 22 to pass over the outer face 40 of the tool without interfering with the bracket 32.

FIG. 10 illustrates how the belt 22 can be installed on the pulley 10. First, bolts (not shown) located within apertures 60 on the bracket 32 can be loosened prior to installation. This allows the bracket 32 to have some vertical play during installation of the belt 22. However, this step is not required for all installation procedures. The belt 22 may next be installed around the pulley 28 on the alternator 30 and all bolts on the alternator 30 can be tightened prior to installing the belt 22 onto the pulley 10 on the flywheel 12. The belt 22 may be then started on the pulley 10 from one side of the engine, here, the port side 62. The belt 22 is then wrapped around the pulley 10, underneath the outer flange 26, until the belt 22 is too taut for further installation by hand. Then, the installer may wedge the tool 34 between the belt 22 and the outer circumferential surface 16 of the pulley 10 as shown. More specifically, the inner surface of the belt 22 will lie over the outer face 40 of the body 36, while the lower edge of the belt 22 more or less rests on the wedge 48, and the upper edge of the belt 22 is engaged by the overhang 50. The flywheel 12, and thus the pulley 10, can thereafter be rotated clockwise, as shown by the arrow CW, in order to increasingly wind the belt 22 around the pulley 10 toward the starboard side 64 of the engine. During such turning, the tool 34 moves with the pulley 10, and the overhang 50 holds the belt 22 down in order to force the belt 22 under the outer flange 26 in a shoehorn manner, while the wedge 48 allows the belt 22 to slide down and over the pulley 10, aided by the beveled surface 52 that provides a transition between the tool 34 and the outer circumferential surface 16 of the pulley 10. The downwardly tapering overhang tapered portion 50b guides the belt 22 down into place on the pulley 10 during installation.

FIG. 11 shows how the tool 34 aids in removal of the belt 22 from the pulley 10. Again, the bolts (not shown) in the apertures 60 on the bracket 32 may be loosened in order to allow access to the area where the tool 34 is to be placed. The tool 34 is then wedged underneath the belt 22 on the starboard side 64 of the engine, as shown in the Figure. In other words, the belt 22 is situated over the outer face 40 of the body 36, with the upper edge of the belt 22 being situated underneath the overhang 50, and the lower edge of the belt 22 resting on the wedge 48. As the pulley 10 is turned in a counterclockwise direction, as shown by the arrow CCW, the tool 34 moves with the pulley 10 and wedges the belt 22 up and over the beveled surface 54 and off the pulley 10. The overhang 50 acts as a retention feature and ensures that the belt 22 is held down during such removal process, so that the belt 22 does not slip up and off the tool 34 completely while the belt 22 is sliding over the top of the outer flange 26. The wedge 48 allows the belt to instead gradually slide up and off the pulley 10.

FIGS. 12-15 illustrate a second embodiment of a tool 34' for installing and removing a stretch fit belt 22 on a pulley 10 coupled to a marine engine. Although not every part or surface of the second embodiment of the tool 34' will be described herein, parts and surfaces that are similar to those of the first embodiment of the tool 34 will be labeled in the drawings with a prime symbol after the corresponding reference number. It should be understood therefore that descriptions of the parts and surfaces noted herein above apply equally to the parts and surfaces called out with the prime symbol in the FIGURES showing the second embodiment of the tool 34', unless otherwise noted herein below. Additionally, although the tool 34' is not shown in connection with the pulley 10 and the belt 22, it should be understood that the tool 34' can be used in the same manner as the tool 34 to install and remove the belt 22 on and off of the pulley 10, as described herein above with respect to FIGS. 10 and 11.

The tool 34' shown in FIGS. 12-15 includes a body 36' having first and second ends 36a', 36b', an arcuate inner face 38' configured to be placed adjacent an outer circumferential surface 16 of the pulley 10, and an opposing outer face 40' configured to guide the belt 22 thereover. At least one arcuate rib 42a' and/or 42b' protrudes from the inner face 38' and is configured to contact a groove on the outer circumferential surface 16 of the pulley 10 to hold the tool 34' in place. A wedge 48' protrudes from a lower portion of the outer face 40' proximate the first end 36a' of the body 36', the wedge 48' sloping downwardly from a wedge upper corner 48a' at the first end 36a' of the body 36' and along the outer face 40' to a wedge lower corner 48b' located between the first and second ends of the body 36'. The wedge 48' also slopes downwardly from the wedge upper corner 48a' and outwardly away from the outer face 40' to a wedge outer corner 48c'. The wedge outer corner 48c' and the wedge lower corner 48b' are connected by a wedge curved edge 48d', and the wedge 48' also slopes downwardly from the wedge upper corner 48a' to the wedge curved edge 48d'.

An overhang 50' protrudes from an upper portion of the outer face 40' proximate the second end 36b' of the body 36'. The overhang 50' has an overhang curved portion 50a' located between the first and second ends of the body 36' and an overhang tapered portion 50b' extending from the overhang curved portion 50a' to the second end 36b' of the body 36'. In the second embodiment, the overhang curved portion 50a' has a larger radius than the overhang curved portion 50a of the first embodiment. The shape of the overhang tapered portion 50b' in the second embodiment is also different, and has a less sharp outline than does the overhang tapered portion 50b of the first embodiment. The overhang 50' projects beyond the second end 36b' of the body 36' (see FIG. 13), obviating the need for the beveled surface 52 (FIG. 1). A gently sloped surface 66 instead eases the transition from the sloped surface 56' to the second end 36b' of the body 36'. The gently sloped surface 66 and the outer face 40' of the body 36' are configured to accommodate a width W of the belt 22 between the wedge lower corner 48b' and the overhang curved portion 50a'. Between the wedge lower corner 48b' and the second end 36b' of the body 36', the outer face 40' is configured to be substantially parallel to the outer circumferential surface 16 of the pulley 10 when the inner face 38' is placed adjacent the outer circumferential surface 16 of the pulley 10.

A ledge 44' protrudes from the inner face 38' of the tool 34'. A lower surface 44a' of the ledge 44' is configured to rest on an outer flange 26 of the pulley 10 when the inner face 38' is placed adjacent the outer circumferential surface 16 of the pulley 10. A handle 70 protrudes from top and rear surfaces of the ledge 44'. The handle 70 can be held by the user to maintain the tool 34' in a desired position on the outer circumferential surface 16 of the pulley 10 while the belt 22 is installed onto and removed therefrom. The handle 70 can have any other size or shape than that shown herein, so long as the handle 70 does not interfere with positioning of the tool 34' on the outer circumferential surface 16 of the pulley 10. The ledge 44' is provided with a tapered bevel 68 that eases travel of the belt 22 over the top of the tool 34'. A beveled surface 54' connects the ledge 44' to the upper portion of the outer face 40' of the body 36' except where the overhang 50' protrudes from the outer face 40'. Thus, the tools 34, 34' of the present disclosure require only a single position with respect to the pulley 10 for both installation and removal of the belt 22. Additionally, only a single tool 34 or 34' is required for both addition and removal. This is in contrast to prior art tools, which either require more than one tool for installation and/or removal or require different orientation of a single tool for installation versus removal. In contrast, the tools 34, 34' of the present disclosure have only one orientation with respect to the pulley 10 and the flywheel 12, which are turned in either a clockwise or counterclockwise direction for respective installation or removal of the belt 22. The tool 34 or 34' rotates with the pulley 10 and wedges under the belt 22 or pushes down on the belt 22, depending on the direction of rotation.

In one example, the tools 34, 34' can be injection molded plastic. The softness of plastic prevents damage to the flywheel finish or to the belt 22 during installation and removal of the belt 22. Plastic is sufficiently strong for the small number of uses expected of the tool over the life of the marine engine.

Note that all references to relative terms, such as "upper," "lower," "up," "down," "left," "right," "front," "back," "top," "bottom," etc. are for exemplary purposes only and describe the tools 34, 34', flywheel 12, pulley 10, and other components with respect to the examples provided herein. Such directions and relative terminology should be understood to apply to the present examples only, and relative orientations of different parts may change depending on the orientation of the engine, flywheel, and/or pulley of a specific application.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies and method steps described herein may be used alone or in combination with other assemblies and methods. It is to be expected that various equivalents, alternatives and modifications are possible within the scope of the appended claims. Each limitation in the appended claims is intended to invoke interpretation under 35 U.S.C. § 112(f), only if the terms "means for" or "step for" are explicitly recited in the respective limitation.

What is claimed is:

1. A tool for installing and removing a stretch fit belt on a pulley coupled to a marine engine, the tool comprising:
    a body having first and second ends, an arcuate inner face configured to be placed adjacent an outer circumferential surface of the pulley, and an opposing outer face configured to guide the belt thereover;
    at least one arcuate rib protruding from the inner face and configured to contact a groove on the outer circumferential surface of the pulley;
    a wedge protruding from a lower portion of the outer face proximate the first end of the body, the wedge sloping downwardly from a wedge upper corner at the first end of the body and along the outer face to a wedge lower corner located between the first and second ends of the body;
    an overhang protruding from an upper portion of the outer face proximate the second end of the body, the overhang having an overhang curved portion located between the first and second ends of the body and an overhang tapered portion extending from the overhang curved portion to the second end of the body;
    a ledge that protrudes from the inner face of the body, wherein a lower surface of the ledge is configured to rest on an outer flange of the pulley when the inner face is placed adjacent the outer circumferential surface of the pulley; and
    a beveled surface that connects the ledge to the upper portion of the outer face of the body except where the overhang protrudes from the outer face;
    wherein the outer face of the body is configured to accommodate a width of the belt between the wedge lower corner and the overhang curved portion.

2. The tool of claim 1, wherein the wedge also slopes downwardly from the wedge upper corner and outwardly away from the outer face to a wedge outer corner.

3. The tool of claim 2, wherein the wedge outer corner and the wedge lower corner are connected by a wedge curved edge, and the wedge also slopes downwardly from the wedge upper corner to the wedge curved edge.

4. The tool of claim 3, wherein between the wedge lower corner and the second end of the body, the outer face of the body is configured to be substantially parallel to the outer circumferential surface of the pulley when the inner face of the body is placed adjacent the outer circumferential surface of the pulley.

5. The tool of claim 1, wherein the overhang tapered portion slopes downwardly away from the overhang curved portion.

6. The tool of claim 5, wherein a depth of the overhang with respect to the outer face of the body is configured to accommodate a thickness of the belt thereunder.

7. The tool of claim 6, wherein a bottom surface of the wedge and a bottom surface of the body are configured to be parallel to an outer surface of a flywheel to which the pulley is connected when the inner face of the body is placed adjacent the outer circumferential surface of the pulley.

8. The tool of claim 7, wherein a height of the outer face of the body beneath the overhang tapered portion is configured to accommodate the width of the belt.

9. A tool for installing and removing a stretch fit belt on a pulley coupled to a marine engine, the tool comprising:
    an arcuate body having first and second ends, an inner face configured to be placed adjacent an outer circumferential surface of the pulley, and an opposing outer face configured to guide the belt thereover;
    a wedge protruding from a lower portion of the outer face proximate the first end of the body, the wedge sloping downwardly from a wedge upper corner and along the outer face to a wedge lower corner between the first and second ends of the body and sloping downwardly from the wedge upper corner and outwardly away from the outer face to a wedge outer corner, wherein the wedge outer corner and the wedge lower corner are connected by a wedge curved edge, and the wedge also slopes downwardly from the wedge upper corner to the wedge curved edge;

an overhang protruding from an upper portion of the outer face proximate the second end of the body, the overhang having an overhang curved portion between the first and second ends of the body and an overhang tapered portion extending from the overhang curved portion and sloping downwardly away from the overhang curved portion toward the second end of the body;

a ledge that protrudes from the inner face of the body, wherein a lower surface of the ledge is configured to rest on an outer flange of the pulley when the inner face is placed adjacent the outer circumferential surface of the pulley; and a beveled surface that connects the ledge to the upper portion of the outer face of the body except where the overhang protrudes from the outer face.

10. The tool of claim 9, wherein between the wedge lower corner and the second end of the body, the outer face of the body is configured to be substantially parallel to the outer circumferential surface of the pulley when the inner face of the body is placed adjacent the outer circumferential surface of the pulley.

11. The tool of claim 10, wherein a bottom surface of the wedge and a bottom surface of the body are configured to be parallel to an outer surface of a flywheel to which the pulley is connected when the inner face of the body is placed adjacent the outer circumferential surface of the pulley.

12. The tool of claim 10, wherein a height of the outer face of the body beneath the overhang tapered portion is configured to accommodate a width of the belt.

13. The tool of claim 9, further comprising at least one rib protruding from the inner face of the body and configured to contact a groove on the outer circumferential surface of the pulley.

14. A tool for installing and removing a stretch fit belt on a pulley coupled to a marine engine, the tool comprising:

an arcuate body having first and second ends, an inner face configured to be placed adjacent an outer circumferential surface of the pulley, and an opposing outer face configured to guide the belt thereover;

a wedge protruding from a lower portion of the outer face proximate the first end of the body, the wedge sloping downwardly from a wedge upper corner at the first end of the body and along the outer face to a wedge lower corner between the first and second ends of the body;

an overhang protruding from an upper portion of the outer face proximate the second end of the body, the overhang having an overhang curved portion between the first and second ends of the body and an overhang tapered portion extending from the overhang curved portion to the second end of the body;

a ledge that protrudes from the inner face of the body, wherein a lower surface of the ledge is configured to rest on an outer flange of the pulley when the inner face of the body is placed adjacent the outer circumferential surface of the pulley; and a beveled surface that connects the ledge to the upper portion of the outer face of the body except where the overhang protrudes from the outer face;

wherein the outer face of the body between the wedge lower corner and the overhang curved portion is configured to accommodate a width of the belt therebetween; and wherein between the wedge lower corner and the second end of the body, the outer face of the body is configured to be substantially parallel to the outer circumferential surface of the pulley when the inner face of the body is placed adjacent the outer circumferential surface of the pulley.

15. The tool of claim 14, wherein the overhang tapered portion slopes downwardly away from the overhang curved portion; and wherein a depth of the overhang with respect to the outer face of the body is configured to accommodate a thickness of the belt thereunder.

16. The tool of claim 14, wherein the wedge also slopes downwardly from the wedge upper corner and outwardly away from the outer face of the body to a wedge outer corner; and wherein the wedge outer corner and the wedge lower corner are connected by a wedge curved edge, and the wedge also slopes downwardly from the wedge upper corner to the wedge curved edge.

* * * * *